United States Patent
Wu et al.

(10) Patent No.: US 9,963,963 B1
(45) Date of Patent: May 8, 2018

(54) WELL RANGING APPARATUS, SYSTEMS, AND METHODS

(71) Applicant: Halliburton Energy Services, Inc., Houston, TX (US)

(72) Inventors: Hsu-Hsiang Wu, Sugar Land, TX (US); Akram Ahmadi Kalateh Ahmad, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days. days.

(21) Appl. No.: 15/842,526

(22) Filed: Dec. 14, 2017

Related U.S. Application Data

(63) Continuation of application No. 14/769,530, filed as application No. PCT/US2015/043580 on Aug. 4, 2015, now Pat. No. 9,874,085.

(Continued)

(51) Int. Cl.
| | |
|---|---|
| *G01V 3/08* | (2006.01) |
| *G01V 3/26* | (2006.01) |
| *G01V 3/28* | (2006.01) |
| *E21B 47/022* | (2012.01) |
| *E21B 47/024* | (2006.01) |
| *G01V 99/00* | (2009.01) |
| *E21B 33/14* | (2006.01) |
| *E21B 7/04* | (2006.01) |

(Continued)

(52) U.S. Cl.
CPC .......... *E21B 47/02216* (2013.01); *E21B 7/04* (2013.01); *E21B 33/14* (2013.01); *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
CPC ....................................................... G01V 3/26
USPC ............................................................ 324/346
See application file for complete search history.

(56) References Cited

U.S. PATENT DOCUMENTS

| | | | |
|---|---|---|---|
| 4,372,398 | A | 2/1983 | Kuckes |
| 4,443,762 | A | 4/1984 | Kuckes |

(Continued)

FOREIGN PATENT DOCUMENTS

| | | |
|---|---|---|
| WO | 2007015087 A1 | 2/2007 |
| WO | 2012134468 A1 | 10/2012 |

(Continued)

OTHER PUBLICATIONS

Definition of well head accessed through Schlumberger Oilfield Glossary on Nov. 15, 2016 via http://www.glossary.oifield.slb.com/Terms/w/wellhead.aspx, 2 pages.

(Continued)

*Primary Examiner* — Bot Ledynh
(74) *Attorney, Agent, or Firm* — Gilliam IP PLLC

(57) ABSTRACT

A series of electromagnetic field strength measurements is acquired from a sensor at multiple depths in a first well, responsive to an electromagnetic field originating at a second well, via at least one of a direct transmission and a backscatter transmission. A drilling phase associated with drilling operations conducted in the first well is determined. A sensor separation depth associated with the drilling phase is selected. An approximate range between the first well and the second well is calculated, based on the series of electromagnetic field strength measurements and the sensor separation depth.

20 Claims, 7 Drawing Sheets

Related U.S. Application Data

(60) Provisional application No. 62/035,877, filed on Aug. 11, 2014, provisional application No. 62/037,440, filed on Aug. 14, 2014, provisional application No. 62/078,732, filed on Nov. 12, 2014.

(51) Int. Cl.
| | | |
|---|---|---|
| *G06F 17/11* | (2006.01) | |
| *E21B 47/12* | (2012.01) | |
| *E21B 43/24* | (2006.01) | |
| *E21B 47/18* | (2012.01) | |

(56) References Cited

U.S. PATENT DOCUMENTS

| | | |
|---|---|---|
| 4,700,142 A | 10/1987 | Kuckes |
| 5,189,415 A | 2/1993 | Shimada et al. |
| 5,230,387 A | 7/1993 | Waters et al. |
| 5,305,212 A | 4/1994 | Kuckes |
| 5,485,089 A | 1/1996 | Kuckes |
| 5,512,830 A | 4/1996 | Kuckes |
| 5,582,248 A | 12/1996 | Estes |
| 5,589,775 A | 12/1996 | Kuckes |
| 6,179,066 B1 | 1/2001 | Nasr et al. |
| 6,525,540 B1 | 2/2003 | Kong et al. |
| 6,985,814 B2 | 1/2006 | McElhinney |
| 7,268,552 B1 | 9/2007 | Gerald, II et al. |
| 7,703,548 B2 | 4/2010 | Clark |
| 7,719,282 B2 | 5/2010 | Fanini et al. |
| 7,962,287 B2 | 6/2011 | Clark |
| 8,011,451 B2 | 9/2011 | MacDonald |
| 8,126,650 B2 | 2/2012 | Lu et al. |
| 8,237,443 B2 | 8/2012 | Hopmann et al. |
| 8,324,912 B2 | 12/2012 | Waid |
| 8,680,866 B2 | 3/2014 | Marsala et al. |
| 8,749,243 B2 | 6/2014 | Bittar et al. |
| 8,844,648 B2 | 9/2014 | Bittar et al. |
| 9,581,718 B2 | 2/2017 | Rodney |
| 9,702,240 B2 | 7/2017 | Bittar et al. |
| 2002/0000808 A1 | 1/2002 | Nichols |
| 2003/0137297 A1 | 7/2003 | Ganesan |
| 2006/0113112 A1 | 6/2006 | Waters |
| 2006/0131013 A1 | 6/2006 | McElhinney |
| 2008/0177475 A1 | 7/2008 | McElhinney et al. |
| 2008/0275648 A1 | 11/2008 | Illfelder |
| 2009/0164127 A1 | 6/2009 | Clark |
| 2009/0178850 A1 | 7/2009 | Waters et al. |
| 2009/0260878 A1 | 10/2009 | Morley et al. |
| 2009/0308657 A1 | 12/2009 | Clark et al. |
| 2010/0194395 A1 | 8/2010 | McElhinney |
| 2010/0300756 A1 | 12/2010 | Bergstrom et al. |
| 2010/0332137 A1 | 12/2010 | Meadows et al. |
| 2011/0015862 A1 | 1/2011 | Sato et al. |
| 2011/0018542 A1 | 1/2011 | Clark et al. |
| 2011/0284731 A1 | 11/2011 | Roscoe et al. |
| 2011/0290011 A1 | 12/2011 | Dowla et al. |
| 2011/0309836 A1 | 12/2011 | Bittar et al. |
| 2012/0013339 A1 | 1/2012 | Kuckes et al. |
| 2012/0109527 A1 | 5/2012 | Bespalov et al. |
| 2012/0139543 A1 | 6/2012 | McElhinney et al. |
| 2012/0158305 A1 | 6/2012 | Rodney et al. |
| 2012/0257475 A1 | 10/2012 | Luscombe et al. |
| 2012/0273192 A1 | 11/2012 | Schmidt et al. |
| 2012/0283952 A1 | 11/2012 | Tang et al. |
| 2013/0056272 A1 | 3/2013 | Kuckes |
| 2013/0068526 A1 | 3/2013 | Snyder et al. |
| 2013/0151158 A1 | 6/2013 | Brooks et al. |
| 2013/0173164 A1 | 7/2013 | Zhang |
| 2013/0184995 A1 | 7/2013 | Sinclair et al. |
| 2013/0333946 A1 | 12/2013 | Sugiura |
| 2014/0132272 A1 | 5/2014 | Cuevas et al. |
| 2014/0191120 A1 | 7/2014 | Donderici et al. |
| 2015/0013968 A1 | 1/2015 | Hsu et al. |
| 2015/0378044 A1 | 12/2015 | Brooks |
| 2016/0258275 A1 | 9/2016 | Wu et al. |
| 2016/0273338 A1 | 9/2016 | Wu |
| 2016/0273339 A1 | 9/2016 | Wu |
| 2016/0273340 A1 | 9/2016 | Roberson et al. |
| 2016/0273341 A1 | 9/2016 | Wu et al. |
| 2016/0273342 A1 | 9/2016 | Wu et al. |
| 2016/0273343 A1 | 9/2016 | Donderici et al. |
| 2016/0273344 A1 | 9/2016 | Wu et al. |

FOREIGN PATENT DOCUMENTS

| | | |
|---|---|---|
| WO | 2013162505 A1 | 10/2013 |
| WO | 2014089402 A2 | 6/2014 |
| WO | 2016025230 A1 | 2/2016 |
| WO | 2016025232 A1 | 2/2016 |
| WO | 2016025235 A1 | 2/2016 |
| WO | 2016025238 A1 | 2/2016 |
| WO | 2016025241 A1 | 2/2016 |
| WO | 2016025245 A1 | 2/2016 |
| WO | 2016025247 A1 | 2/2016 |

OTHER PUBLICATIONS

Definition of cement accessed through Schlumberger Oilfield Glossary on Nov. 15, 2016 via http://www.glossary.oilfield.slb.com/Terms/c/cement.aspx, 3 pages.

"U.S. Appl. No. 14/769,476, Non Final Office Action dated Oct. 27, 2016", 17 pgs.

"U.S. Appl. No. 14/769,476, Restriction Requirement dated Aug. 12, 2016", 9 pgs.

"U.S. Appl. No. 14/769,539, Non Final Office Action dated Aug. 5, 2016", 32 pgs.

"International Application Serial No. PCT/US2015/043557, International Preliminary Report on Patentability dated Feb. 23, 2017", 7 pages.

"International Application Serial No. PCT/US2015/043557, International Search Report dated Oct. 19, 2015", 3 pgs.

"International Application Serial No. PCT/US2015/043557, Written Opinion dated Oct. 19, 2015", 5 pgs.

"International Application Serial No. PCT/US2015/043566, International Search Report dated Oct. 26, 2015", 3 pgs.

"International Application Serial No. PCT/US2015/043566, Written Opinion dated Oct. 26, 2015", 11 pgs.

"International Application Serial No. PCT/US2015/043577, International Search Report dated Oct. 21, 2015", 3 pgs.

"International Application Serial No. PCT/US2015/043577, Written Opinion dated Oct. 21, 2015", 9 pgs.

"International Application Serial No. PCT/US2015/043580, International Search Report dated Nov. 11, 2015", 3 pgs.

"International Application Serial No. PCT/US2015/043580, Written Opinion dated Nov. 11, 2015", 9 pgs.

"International Application Serial No. PCT/US2015/043587, International Search Report dated Oct. 26, 2015", 3 pgs.

"International Application Serial No. PCT/US2015/043587, Written Opinion dated Oct. 26, 2015", 11 pgs.

"International Application Serial No. PCT/US2015/043604, International Search Report dated Oct. 28, 2015", 3 pgs.

"International Application Serial No. PCT/US2015/043604, Written Opinion dated Oct. 28, 2015", 14 pgs.

"International Application Serial No. PCT/US2015/043621, International Search Report dated Oct. 19, 2015", 3 pgs.

"International Application Serial No. PCT/US2015/043621, Written Opinion dated Oct. 19, 2015", 5 pgs.

"International Application Serial No. PCT/US2015/043639, International Search Report dated Oct. 27, 2015", 3 pgs.

"International Application Serial No. PCT/US2015/043639, Written Opinion dated Oct. 27, 2015", 10 pgs.

Van Dongen, "A Directional Borehole Radar System for Subsurface Imaging", DUP Science, Jan. 1, 2002 00:00:00.0, 111 pgs.

CA First Exam Report; Application serial No. 2,954,723; dated Dec. 5, 2017, 3 pages.

CA First Exam Report; Application Serial No. 2,954,303; dated Nov. 29, 2017, 4 pages.

(56) References Cited

OTHER PUBLICATIONS

CA First Exam Report Application Serial No. 2,954,301; dated Nov. 29, 2017, 5 pages.
CA Application Serial No. 2954674, Examiner's Letter, dated Dec. 12, 2017, 3 pages.
CA application serial No. 2954726 Examiner's Letter dated Dec. 12, 2017, 3 pages.

WELL RANGING APPARATUS, SYSTEMS, AND METHODS

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
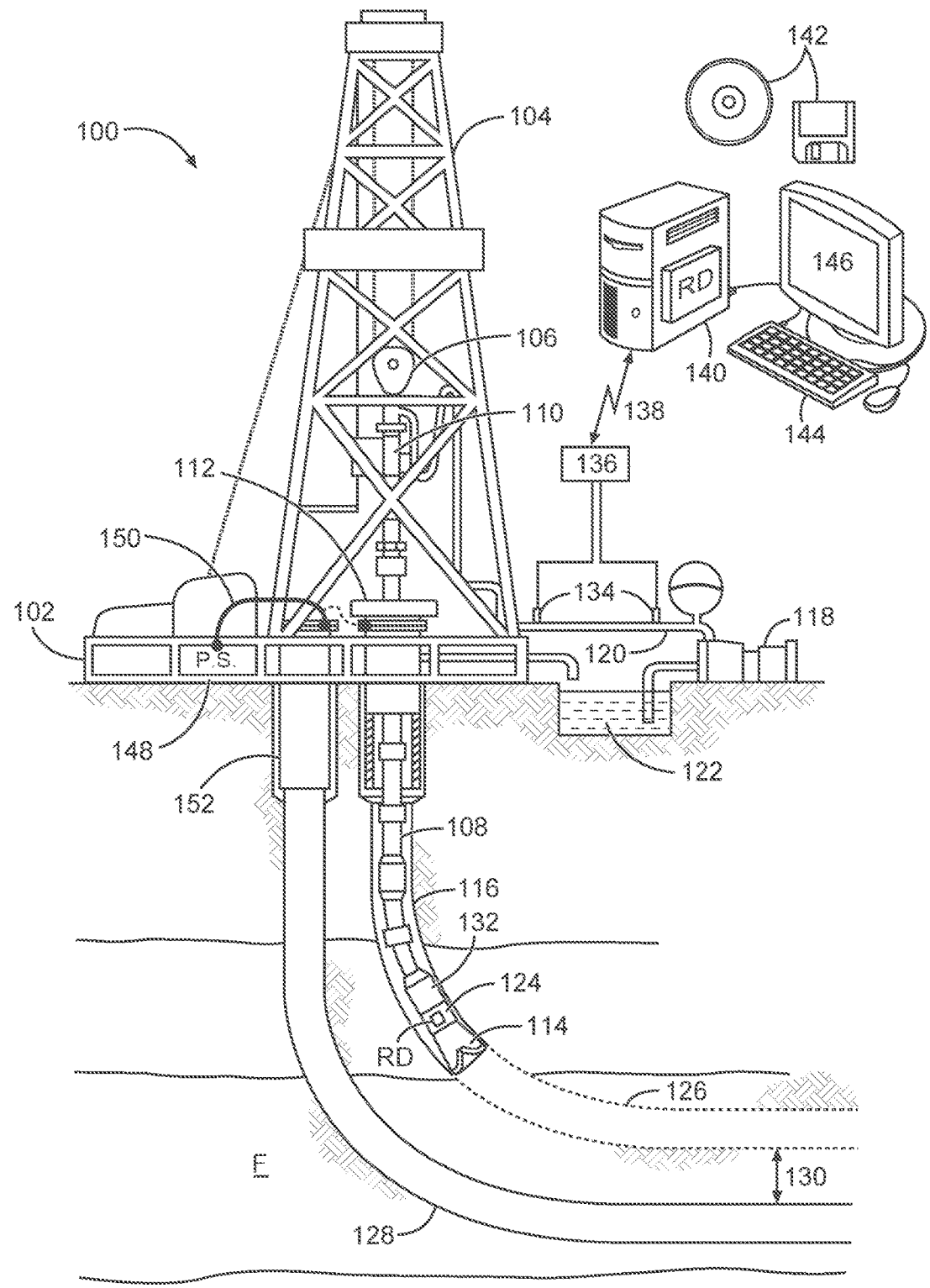
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly (BHA) that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The BHA further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the BHA. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined. The power supply 148 can also be connected to inject current into the casing of the drilling well 126.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

To obtain gradient measurements at each depth in the drilled well, two sensors separated in the radial direction (with respect to the target well location) are often used. The difference in measurement values between these sensors gives a measurement of the field strength gradient. Because the separation distance between the sensors is relatively small with respect to the ranging distance between the wells, especially when "T" intersection applications arise, the difference in field measurements between the two sensors is often very small. Thus, it is difficult to determine the true gradient measurement using this conventional system.

As a solution to this technical problem, directional tool measurements, including ranging applications, are used to enable pseudo-gradient field calculations for "T" intersection ranging applications (e.g., well avoidance or well intersection). A pseudo-gradient field is a field that is determined by measuring field strength at different depths, rather than at a single depth. Separating sensors in the vertical direction of the well, rather than in the horizontal or azimuthal direction, can provide a more accurate measurement of the gradient field because there is a larger relative separation between measured values. The result of implementing the apparatus, systems, and methods described herein may thus be improved accuracy when determining the range between wells at greater depths. Sensor noise effects on ranging performance may also be reduced. Various embodiments that have been developed to provide some of these advantages will now be described.

Detailed Presentation

In well Intersection/well avoidance applications, gradient measurements have been used to determine the relative distance between a target well and a drilling well. However, it can be challenging to detect the location of the target well at great depths. This is because the available gradient field measurements are small, due to sensor space limitations on the BHA. Therefore, sensor noise and other artifacts will affect the ranging accuracy at greater depths.

The apparatus, methods, and systems described herein use field strength intensity measurements of magnetometers at a variety of depths to generate pseudo-gradient measurements, to improve the ranging accuracy to a target well at greater depths. Owing to larger sensor separation for these pseudo-gradient measurements, the measurements have better capabilities in the presence of noise, as compared to regular gradient measurements made from two sensors at same depth in the well.

Figure 2:
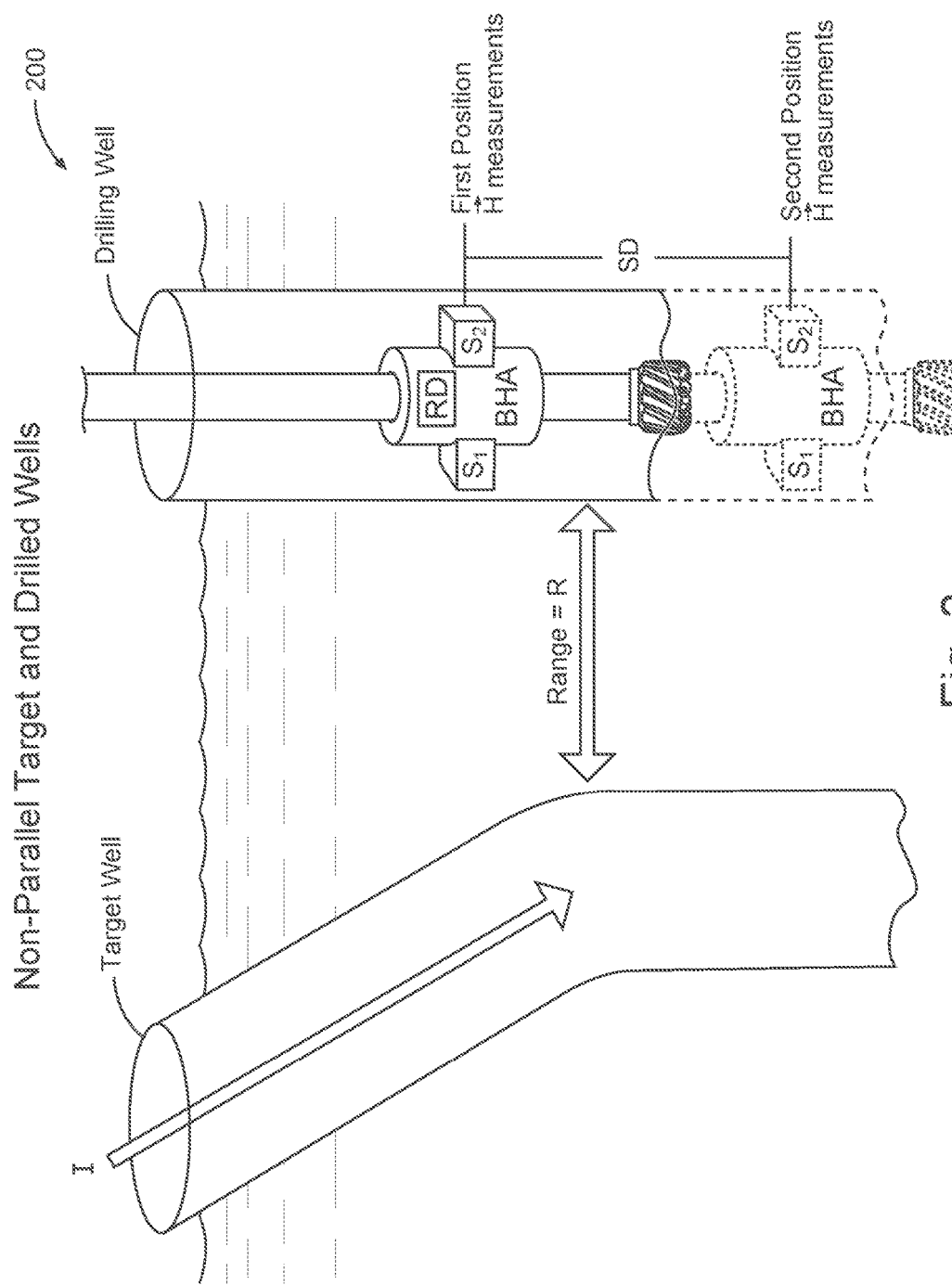
FIG. 2 is a block diagram of a well ranging system, according to various embodiments.

For example, FIG. 2 is a block diagram of a well ranging system 200, according to various embodiments. Here the drilling well is non-parallel to the target well, and the drilling well is being drilled to either intercept the target well, or to avoid interception. Since the difference in depth for each field strength measurement is known, measurements by a single sensor S2, separated by some depth SD, can be treated as measurements from two different sensors that make independent measurements. This method of operation effectively increases the separation between measurement locations, improving the accuracy of the gradient calculation, which in turn improves the accuracy of the range determination. The separation depth SD can be adjusted, based on the expected range R to the target well. Thus, if the target well is far away, the vertical measurement separation can be greater (with less measurement resolution), or if the target well moves closer as a result of the drilling activity, the separation depth SD can be reduced, to increase measurement resolution. All three measured field components (e.g., normal N, tangential T, and azimuthal z) can be used to determine the range R.

Figure 3:
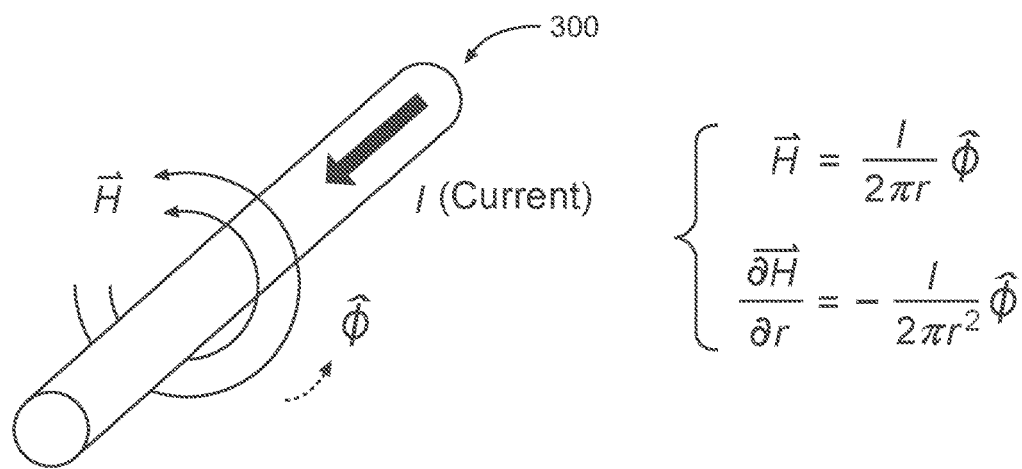
FIGS. 3 to 5 illustrate a variety of apparatus, method, and system configurations for various range determination embodiments.
Figure 4:
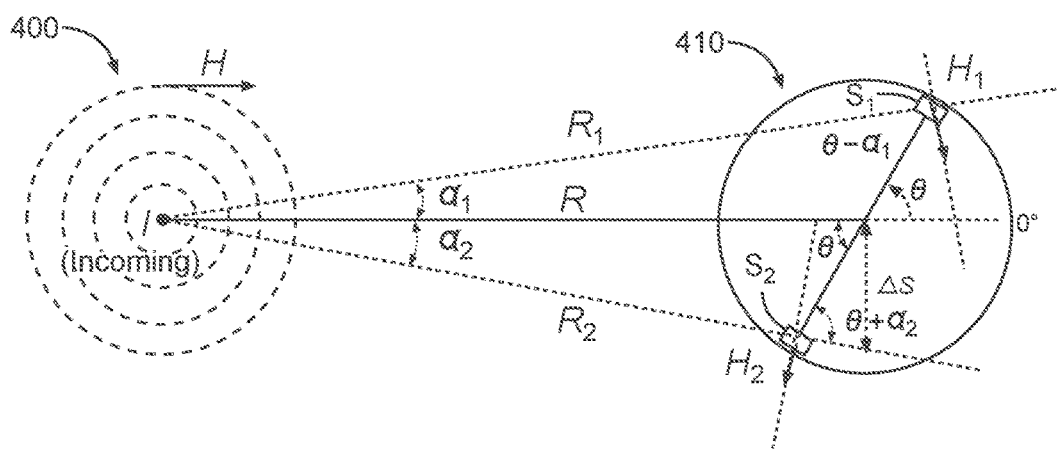
Figure 5:
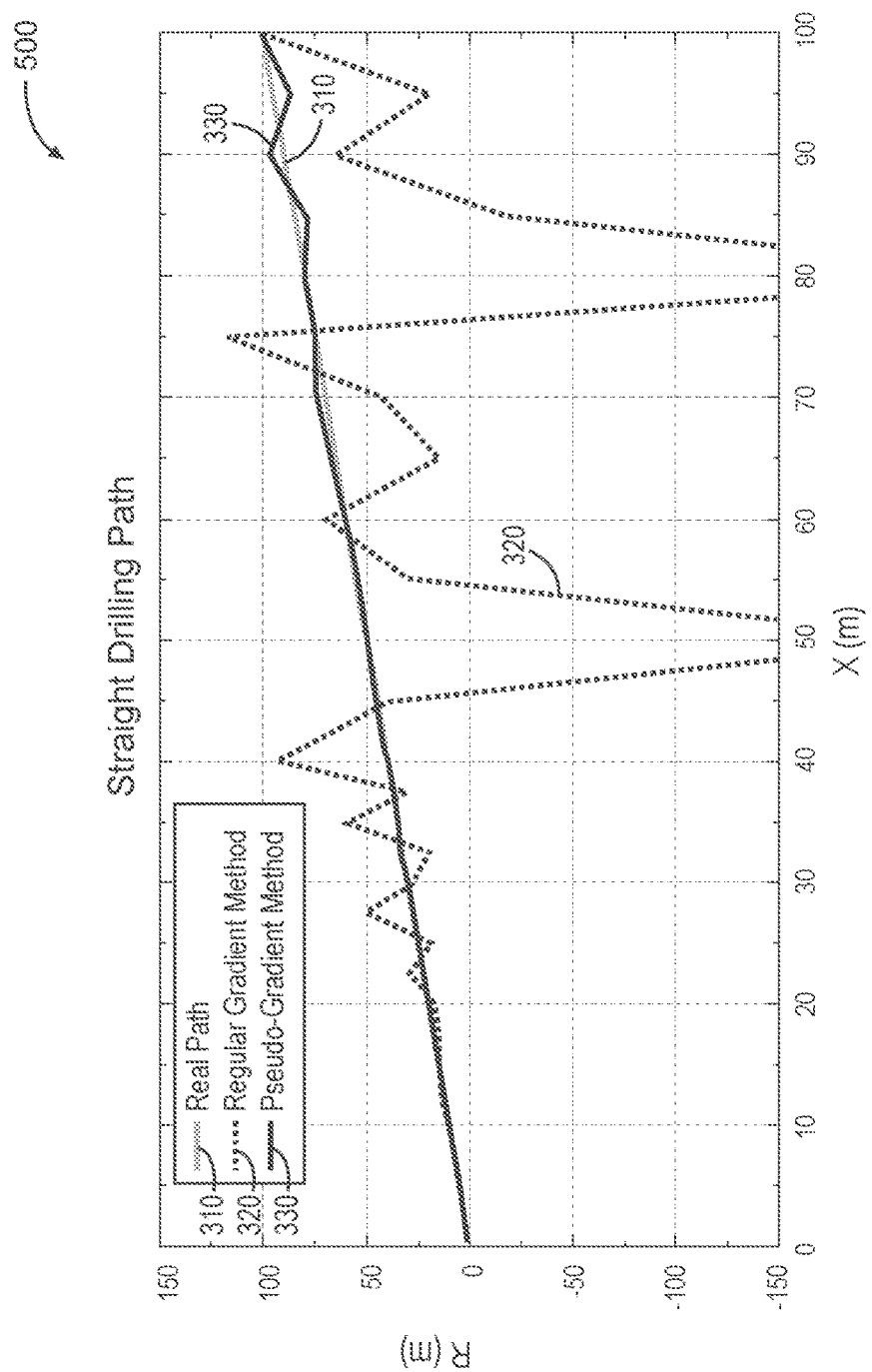

FIGS. 3 to 5 illustrate a variety of apparatus, method, and system configurations for various range determination embodiments. In FIG. 3, an infinite line source 300 with a constant current I can be seen. Based on Ampere's law, the magnetic field H at low frequency surrounding the line source, and shown in perspective view, is expressed as:

$$\vec{H} = \frac{I}{2\pi r}\hat{\Phi}, \quad (1)$$

where r is the distance between an observation point and the infinite line source. In addition, the gradient field can be obtained by $$\frac{\partial \vec{H}}{\partial r} = -\frac{I}{2\pi r^2}\hat{\Phi}. \quad (2)$$

Consequently, the distance r can be directly computed by taking ratio of the amplitude of Equation (1) to the amplitude of Equation (2), as given by $$\left|\frac{\vec{H}}{\frac{\partial \vec{H}}{\partial r}}\right| = \left|\frac{\frac{I}{2\pi r}}{\frac{-I}{2\pi r^2}}\right| = r. \quad (3)$$

Equation (3) is the conventional gradient method used to compute ranging distance r (equivalent to the range R in FIG. 2).

In practice, two sensors (e.g., magnetometers) are used to obtain magnetic field and gradient field measurements as shown in FIG. 4, which presents a top view of an infinite line source 400 and a logging tool 410 equipped with two sensors S1, S2 for gradient field determination. A finite difference method is then utilized to calculate the magnetic field strength H and the gradient field strength, as given by:

$$\vec{H} = \frac{\vec{H}_1 + \vec{H}_2}{2}, \text{ and} \quad (4a)$$

$$\frac{\partial \vec{H}}{\partial r} = \frac{\vec{H}_1 - \vec{H}_2}{2\Delta S}, \quad (4b)$$

where $H_1$ and $H_2$ are the total field measurements at sensors S1 and S2, respectively. $\Delta S$ is the separation distance between one of the two sensors, and the location of a mid-point between the two sensors. Consequently, Equation (3) can be modified based on the finite difference method to compute the ranging distance r as follows:

$$r = \left|\frac{\frac{\vec{H}_1 + \vec{H}_2}{2}}{\frac{\vec{H}_1 - \vec{H}_2}{2\Delta S}}\right|. \quad (5)$$

For a given ranging distance r, Equation (5) reveals that as the separation distance $\Delta S$ increases, so does the field difference between sensors S1 and S2. Consequently, the gradient field given by Equation (4b) will have improved anti-noise capability, extended the detection range to greater depths.

To achieve a greater sensor separation distance, the two sensors S1, S2 in FIG. 4 can be located farther apart on the tool, as part of the BHA. Or a single sensor S2 can be used to take two measurements at two different depths in the well, to implement the gradient calculations shown in Equations (4) and (5), as shown in FIG. 2, where $H_1$ represents the measurements at a first depth and $H_2$ represents the measurements at a second depth. The first depth and the second depth can be controlled based on the desired separation distance $\Delta S$, which will be the separation between one of the two depths and the center of the two depths (e.g., $2\Delta S$ may be the separation between the two depths, which is equivalent to the separation distance SD).

On the other hand, the gradient field approximation based on a finite difference method at Equation (4) may not yield the accuracy desired when the separation distance $\Delta S$ becomes large with respect to the range. Consequently, there is a trade-off between improved anti-noise capability, and approximation accuracy in choosing the separation of pseudo-gradient measurement locations.

In some embodiments, well-intersection and well-avoidance operations are divided into three phases: identify, follow, and intercept/avoid. The identify phase occurs at the greatest distance from the target well (e.g., at a ranging distance r=about 40 m-100 m) and the need for accuracy is not as great; sensors may locate the target well position with less accuracy. After a rough determination of the target well location is made, the follow phase ensues.

In the follow phase, which occurs at a ranging distance of about r=20 m to about 40 m, the desired drilling path is defined, based on the likely target well location. Thus, at this point, an improved ranging accuracy is desired; with more resolution than was used for the identify phase. After the drilling path is defined in the follow phase, the intercept/avoid phase begins.

In this final phase, where the ranging distance is usually less than r=20 m, a decision is made to intercept the target well, or to avoid the target well. At this point, a smaller separation of sensors is useful to meet increased accuracy requirements.

To balance requirements in the different phases, the sensor separation is chosen with respect to the phase in operation, and the accuracy desired. Thus, when the drilling well is far away from the target well (e.g., more than 50 m), a large sensor separation, such as 5 m of separation, can be chosen for improved detection ranging at greater depths. That is, when the range is relatively large, the ranging accuracy can be low. Once the follow phase begins, sensor separation may be reduced to 2.5 m to increase the ranging accuracy. And once the intercept/avoid phase operations begin, sensor separation may be reduced to 0.5 m for even greater ranging accuracy.

FIG. 5 presents a graph 500 that compares ranging performance when using a conventional gradient sensor design (e.g., where two sensors are installed on the same BHA, and both are used to make ranging measurements, relying on the separation distance between the sensors on the BHA to provide a difference in measurement values) and the proposed pseudo-gradient mechanism described herein, where random noise of ±100 pT is added to all measurements. Here the range for the actual path 310 followed by the target well, versus the path 320 indicated by measurements using the regular (conventional) method 320, and the path 330 indicated when using the balanced depth separation method to generate a pseudo-gradient, can be seen.

For the regular (conventional) design, two sensors are used, with a fixed BHA spacing of about 0.1 m between them, whereas the design utilizing only one sensor to take measurements at different depths, as proposed herein, makes use of a balanced spacing technique (5 m, 2.5 m, and 0.5 m, depending on the drilling phase) to provide a pseudo-gradient. As shown in the figure, the pseudo-gradient path 330 follows the actual path 310 of the target well fairly closely. The regular gradient method 320 does not reliably locate the target well until the ranging distance is less than about 40 m. However, the pseudo-gradient mechanism 330 is able to determine the target well location at much greater distances, even with the injection of noise.

Figure 6:
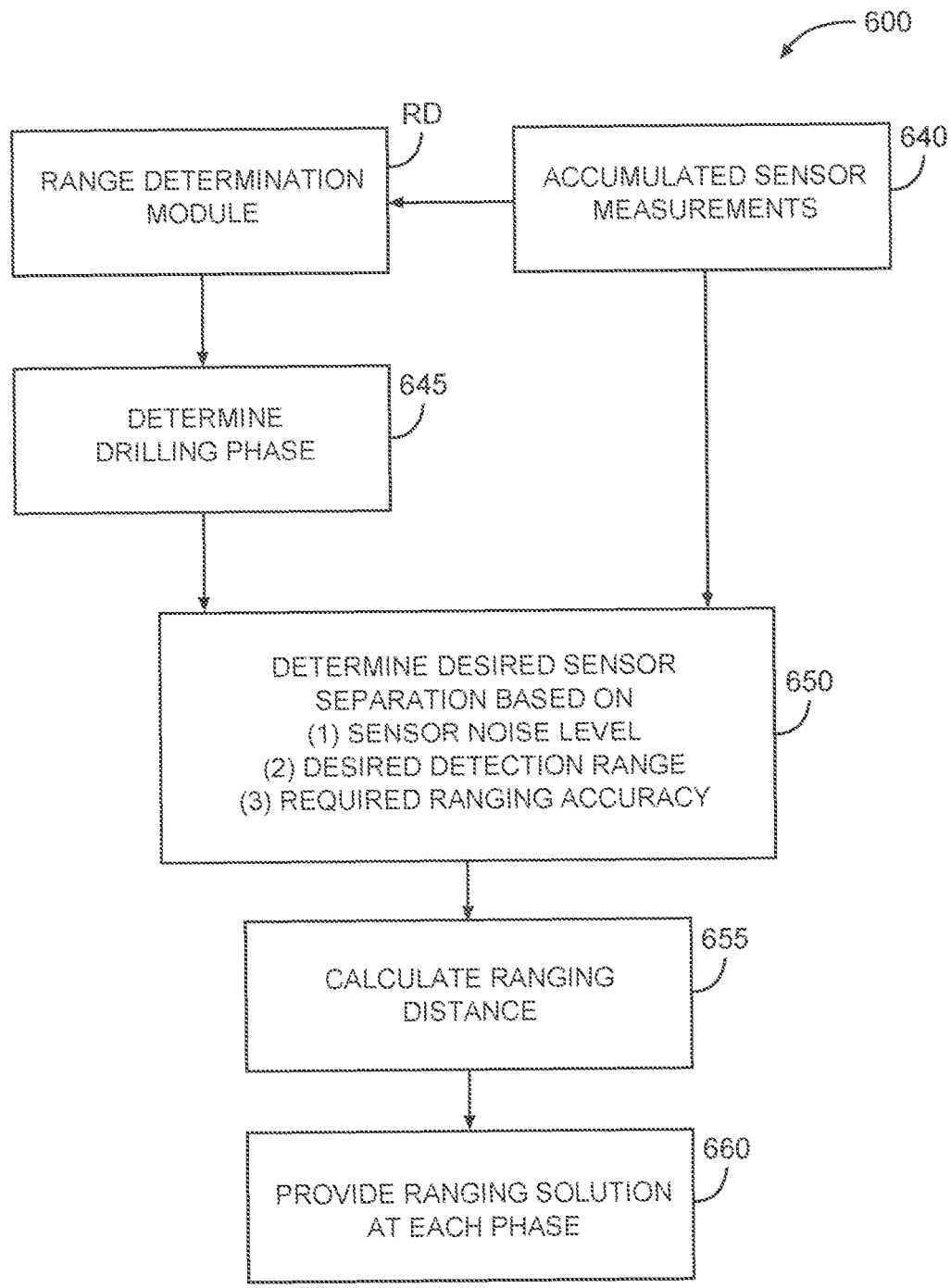
FIG. 6 is a flow diagram of a well ranging method, according to various embodiments.

FIG. 6 is a flow diagram of a well ranging method 600, according to various embodiments. To begin generating a pseudo-gradient, sensor measurements at different depths are recorded and accumulated at block 640. These can be passed to a processing unit, such as a Range Determination Module RD which may be located down hole, or at the surface.

The processing unit can be used to determine which drilling phase is in effect at the current sensor depth (or bit depth) at block 645. These phases may include the identify, follow, and intercept/avoid phases, as noted previously.

Then, the processing unit can be used to choose a suitable sensor separation from the available accumulated sensor measurements at block 650. Three criteria can be used to select the desired sensor separation, including: (1) the sensor noise level, (2) the desired detection range, and (3) the desired ranging accuracy. The sensor noise level can be provided based on lab noise testing or can be determined in real-time from background measurements, as is known to those of ordinary skill in the art. The desired range for detection, as well as the accuracy for range determination, are determined using customer requirements, or values corresponding to the different drilling phases (e.g., identify, follow, intercept/avoid).

Once a suitable separation distance is chosen at block 650, and sufficient measurements are obtained from the sensor(s), the ranging distance will be calculated at block 655. Finally, a ranging solution can be provided for different drilling phases at block 660.

Additional Detailed Description and Some Representative Embodiments

Figure 7:
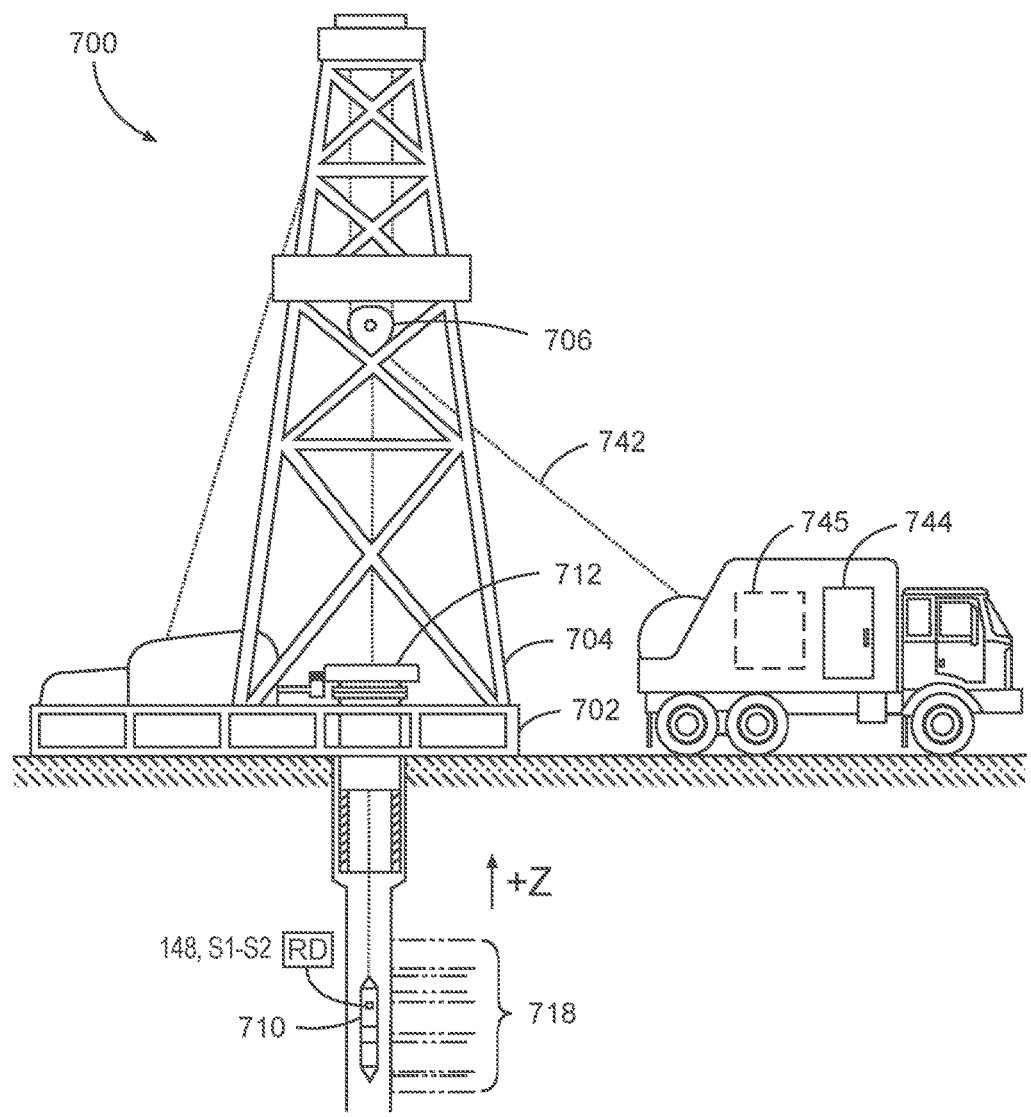
FIG. 7 is a block diagram of a wireline system implementation, according to various embodiments.

FIG. 7 is a block diagram of a wireline system 700 implementation of various embodiments. The system 700 of FIG. 7 may include any of the embodiments of receiver or sensor mounting discussed previously. In this case, a hoist 706 may be included as a portion of a platform 702, such as coupled to a derrick 704, and used to raise or lower equipment such as a wireline sonde 710 into or out of a borehole. The wireline sonde 710 may include any one or more of the above-described embodiments, including sensors and a range determination module RD.

In this wireline example, a cable 742 may provide a communicative coupling between a logging facility 744 (e.g., including a processor circuit 745 including memory or other storage or control circuitry) and the sonde 710. In this manner, information about the formation 718 may be obtained. The processor circuit 745 can be configured to access and execute instructions stored in a memory to implement any of the methods described herein (e.g., by accessing a range determination module RD).

Figure 8:
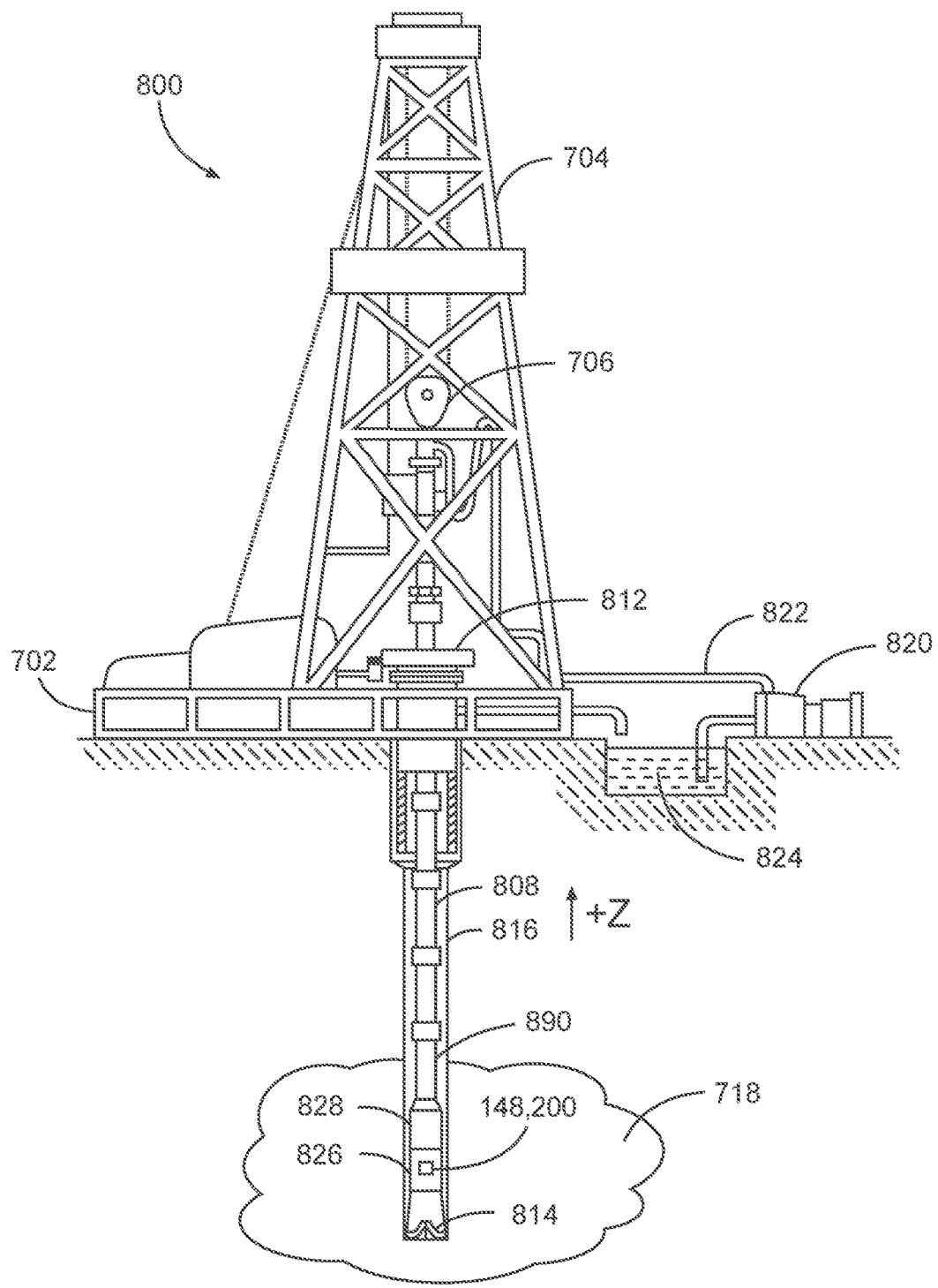
FIG. 8 is a block diagram of a drilling system implementation, according to various embodiments.

FIG. 8 is a block diagram of a drilling system implementation of various embodiments. This diagram shows a drilling rig system 800 according to various embodiments that may include measurement while drilling (MWD) or logging while drilling (LWD) capability. The drilling apparatus can use data from a tool or housing in the drill string 808, having attached to a number of receivers or sensors (e.g., including sensors S1, S2) as discussed previously, and using acquired and calculated ranging information to steer the drill bit 814.

A drilling rig or platform 702 generally includes a derrick 704 or other supporting structure, such as including or coupled to a hoist 706. The hoist 706 may be used for raising or lowering equipment or other apparatus such as drill string 808. The drill string 808 may access a borehole 816, such as through a well head 712. The lower end of the drill string 808 may include various apparatus, such as a drill bit 814, such as to provide the borehole 816.

A drilling fluid or "mud" may be circulated in the annular region around the drill bit 814 or elsewhere, such as provided to the borehole 816 through a supply pipe 822, circulated by a pump 820, and returning to the surface to be captured in a retention pit 824 or sump. Various subs or tool assemblies may be located along the drill string 808, such as a bottom hole assembly (BHA) 826 or a second sub 828. The BHA 826 and/or the sub 828 may include one or more sensors or receivers (e.g., including sensors S1, S2), as described herein, along with a current source (e.g., power supply 148) to initiate a ranging signal, and a processor with access to a memory that contains a program to implement any of the methods described herein (e.g., a ranging determination module RD).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or some other form of a data processing device 140, to implement portions of a method of the present disclosure, for example the processes and methods described in FIG. 6 (e.g., for computer-assisted well completion).

Though sometimes described serially in the examples of FIG. 6, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules.

Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized.

Similarly, while some of the above-described embodiments may show only one receiver, perhaps in the form of a magnetometer, coil, or telemetry receiver, one of ordinary skill in the art would realize that a drill string or downhole tool may include multiple receivers for making the various measurements described herein. Examples of various embodiments will now be listed in a non-limiting fashion, each of which may be combined with one or more of the other embodiments listed.

In some embodiments, a method of range determination comprises first receiving three orthogonal components as a first set of field strength components measured by a sensor when the sensor is located at a first depth of a first well. In some embodiments, the method go on to include moving the sensor to a second depth in the first well; second receiving three orthogonal components as a second set of field strength components measured by the sensor when the sensor is located at the second depth; and first determining a first approximate range from the single sensor to a second well, using the first set and the second set of field strength components to determine a field gradient, wherein the second well serves as an electromagnetic field source that determines a magnitude of the three orthogonal components during the first receiving and the second receiving, via direct transmission or backscatter transmission.

In some embodiments, the method further comprises moving the sensor to a third depth in the first well; third receiving three orthogonal components as a third set of field strength components measured by the sensor when the sensor is located at the third depth; and second determining a second approximate range from the sensor to the second well, using the third set and at least one of the first set or the second set of field strength components to determine a confirming field gradient, to confirm the first approximate range by comparing the first approximate range with the second approximate range.

In some embodiments, the method further comprises selecting a separation between the first depth and the second depth to be a first distance (e.g., about 5 m), until a follow drilling phase of drilling operations begins.

In some embodiments, the method further comprises selecting the separation between the first depth and the second depth to be a second distance (e.g. about 2.5 m), less than the first distance, when the follow drilling phase of drilling operations begins, until an intercept drilling phase or an avoid drilling phase of the drilling operations begins.

In some embodiments, the method further comprises selecting the separation between the first depth and the second depth to be a third distance (e.g., about 0.5 m), less than the second distance, when the intercept drilling phase or the avoid drilling phase of the drilling operations begins.

In some embodiments, a method comprises acquiring a series of electromagnetic field strength measurements from a single sensor at multiple depths in a first well, responsive to an electromagnetic field originating at a second well, via direct transmission or backscatter transmission. In some embodiments, the method goes on to include determining a drilling phase associated with drilling operations conducted in the first well; selecting a sensor separation depth associated with the drilling phase; and calculating an approximate range between the first well and the second well, based on the series of electromagnetic field strength measurements and the sensor separation depth.

In some embodiments, the drilling phase is one of identify, follow, intercept, or avoid. In some embodiments, the sensor separation depth associated with the identify drilling phase is greater than the sensor separation depth associated with the follow drilling phase, which is greater than the sensor separation depth associated with the intercept or the avoid drilling phases.

In some embodiments, determining the drilling phase associated with drilling operations conducted in the first well comprises determining the drilling phase in effect at a current sensor depth or a current bit depth corresponding to a time of calculating the approximate range.

In some embodiments, selecting the sensor separation depth associated with the drilling phase comprises selecting the sensor separation depth based on sensor noise level. In some embodiments, the sensor noise level is based on lab noise testing or real-time from background measurements.

In some embodiments, selecting the sensor separation depth associated with the drilling phase comprises selecting the sensor separation depth based on desired detection range. In some embodiments, selecting the sensor separation depth associated with the drilling phase comprises selecting the sensor separation depth based on desired ranging accuracy.

In some embodiments, as shown in FIGS. 1, 4, and 7-8, an apparatus comprises a down hole tool housing attached to a sensor, the down hole housing to be disposed in a first well; and a range determination module RD communicatively coupled to the sensor, the module to determine an approximate range from the sensor to a second well, using a first set of field strength components and a second set of field strength components to determine a field gradient. In some embodiments, the second well serves as an electromagnetic field source, via direct transmission or backscatter transmission, and the range determination module RD operates to determine a magnitude of three orthogonal components forming each of the first and the second set of field strength components acquired by the sensor during a first reception operation at a first depth of the first well, and during a second reception operation at a second depth of the first well, respectively.

In some embodiments, the sensor comprises a magnetometer.

In some embodiments, the range determination module is to choose a separation of the first depth and the second depth from available accumulated background sensor measurements including at least one of sensor noise level, selected detection range, or selected ranging accuracy.

In some embodiments, the down hole tool housing comprises one or more of a wireline sonde, a bottom hole assembly, a drill collar, a drill string pipe, or a sub.

In some embodiments, as shown in FIGS. 1, 4, and 7-8, a system comprises a current source to couple current to one of a target well or a drilling well; and an apparatus that comprises a down hole tool housing attached to a sensor, the down hole housing to be disposed in the drilling well, and a range determination module RD communicatively coupled to the sensor. The range determination module RD may operate to determine an approximate range from the sensor to the target well, using a first set of field strength components and a second set of field strength components to determine a field gradient, wherein the target well serves as an electromagnetic field source, via direct transmission or backscatter transmission, that determines a magnitude of three orthogonal components forming each of the first and the second set of field strength components acquired by the sensor during a first reception operation at a first depth of the drilling well, and during a second reception operation at a second depth of the drilling well, respectively.

In some embodiments, the range determination module RD is attached to the down hole tool housing. In some embodiments, the down hole tool housing comprises a drill string.

In some embodiments, an apparatus comprises a down hole tool housing (e.g., ranging tool 124) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 7). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:
   acquiring a series of electromagnetic field strength measurements from a sensor at multiple depths in a first well, responsive to an electromagnetic field originating at a second well, via at least one of a direct transmission and a backscatter transmission;
   determining a drilling phase associated with drilling operations conducted in the first well;
   selecting a sensor separation depth associated with the drilling phase; and
   calculating an approximate range between the first well and the second well, based on the series of electromagnetic field strength measurements and the sensor separation depth.

2. The method of claim 1, wherein the drilling phase is at least one of identify, follow, intercept, and avoid.

3. The method of claim 2, wherein the sensor separation depth associated with the identify drilling phase is greater than the sensor separation depth associated with the follow drilling phase, which is greater than the sensor separation depth associated with at least one of the intercept the avoid drilling phases.

4. The method of claim 1, wherein determining the drilling phase associated with drilling operations conducted in the first well comprises:
   determining the drilling phase in effect at at least one of a current sensor depth and a current bit depth corresponding to a time of calculating the approximate range.

5. The method of claim 1, wherein selecting the sensor separation depth associated with the drilling phase comprises:
  selecting the sensor separation depth based on sensor noise level.

6. The method of claim 5, wherein the sensor noise level is based on at least one of lab noise testing and real-time from background measurements.

7. The method of claim 1, wherein selecting the sensor separation depth associated with the drilling phase comprises:
  selecting the sensor separation depth based on desired detection range.

8. The method of claim 1, wherein selecting the sensor separation depth associated with the drilling phase comprises:
  selecting the sensor separation depth based on desired ranging accuracy.

9. An apparatus comprising:
  a downhole tool having a sensor, wherein the sensor is to acquire a series of electromagnetic field strength measurements at multiple depths in a first well, responsive to an electromagnetic field originating at a second well, via at least one of a direct transmission and a backscatter transmission;
  a processor; and
  a machine-readable medium having program code executable by the processor to cause the processor to,
    determine a drilling phase associated with drilling operations conducted in the first well;
    select a sensor separation depth associated with the drilling phase; and
    determine an approximate range between the first well and the second well, based on the series of electromagnetic field strength measurements and the sensor separation depth.

10. The apparatus of claim 9, wherein the drilling phase is at least one of identify, follow, intercept, and avoid.

11. The apparatus of claim 10, wherein the sensor separation depth associated with the identify drilling phase is greater than the sensor separation depth associated with the follow drilling phase, which is greater than the sensor separation depth associated with at least one of the intercept the avoid drilling phases.

12. The apparatus of claim 9, wherein the program code to executable by the processor to cause the processor to determine the drilling phase associated with drilling operations conducted in the first well comprises:
  program code executable by the processor to cause the processor to determine the drilling phase in effect at at least one of a current sensor depth and a current bit depth corresponding to a time of calculating the approximate range.

13. The apparatus of claim 9, wherein the program code to executable by the processor to cause the processor to select the sensor separation depth associated with the drilling phase comprises:
  program code executable by the processor to cause the processor to select the sensor separation depth based on sensor noise level.

14. The apparatus of claim 13, wherein the sensor noise level is based on at least one of lab noise testing and real-time from background measurements.

15. The apparatus of claim 9, wherein the program code to executable by the processor to cause the processor to select the sensor separation depth associated with the drilling phase comprises:
  program code executable by the processor to cause the processor to select the sensor separation depth based on desired detection range.

16. The apparatus of claim 9, wherein the program code to executable by the processor to cause the processor to select the sensor separation depth associated with the drilling phase comprises:
  program code executable by the processor to cause the processor to select the sensor separation depth based on desired ranging accuracy.

17. One or more non-transitory machine-readable storage media comprising program code executable by a processor to cause the processor to:
  acquire a series of electromagnetic field strength measurements from a sensor at multiple depths in a first well, responsive to an electromagnetic field originating at a second well, via at least one of a direct transmission and a backscatter transmission;
  determine a drilling phase associated with drilling operations conducted in the first well;
  select a sensor separation depth associated with the drilling phase; and
  calculate an approximate range between the first well and the second well, based on the series of electromagnetic field strength measurements and the sensor separation depth.

18. The one or more non-transitory machine-readable storage media of claim 17,
  wherein the drilling phase is at least one of identify, follow, intercept, and avoid, and
  wherein the sensor separation depth associated with the identify drilling phase is greater than the sensor separation depth associated with the follow drilling phase, which is greater than the sensor separation depth associated with at least one of the intercept the avoid drilling phases.

19. The one or more non-transitory machine-readable storage media of claim 17, wherein the program code executable by the processor to cause the processor to determine the drilling phase associated with drilling operations conducted in the first well comprises:
  program code executable by the processor to cause the processor to determine the drilling phase in effect at at least one of a current sensor depth and a current bit depth corresponding to a time of calculating the approximate range.

20. The one or more non-transitory machine-readable storage media of claim 17, wherein the program code executable by a processor to cause the processor to select the sensor separation depth associated with the drilling phase comprises:
  program code executable by a processor to cause the processor to select the sensor separation depth based on sensor noise level, wherein the sensor noise level is based on at least one of lab noise testing and real-time from background measurements.

* * * * *